UNITED STATES PATENT OFFICE.

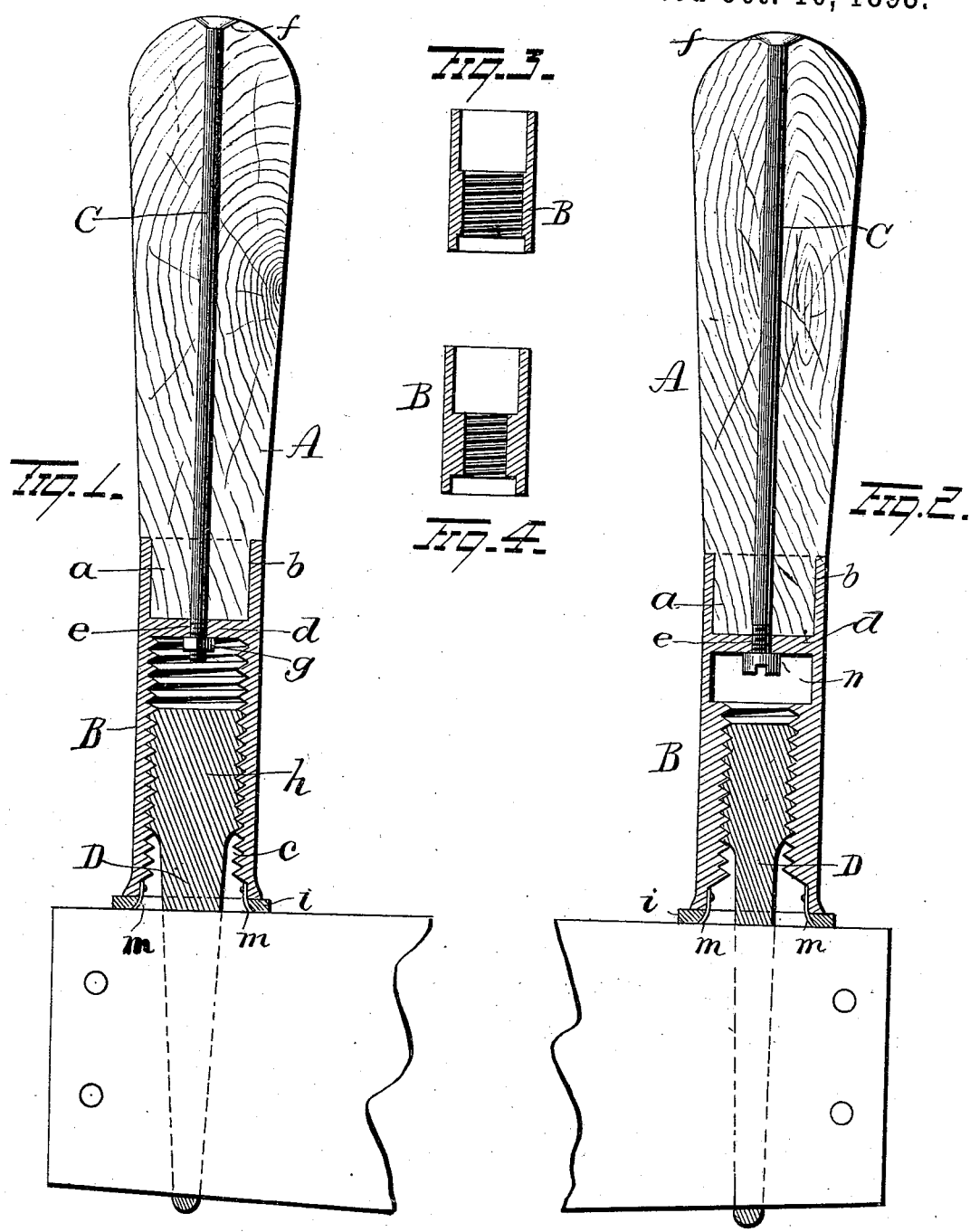

JOHN WATT MILLER, OF PENFIELD, PENNSYLVANIA.

SAW-HANDLE.

SPECIFICATION forming part of Letters Patent No. 506,245, dated October 10, 1893.

Application filed June 21, 1892. Serial No. 437,528. (No model.)

*To all whom it may concern:*

Be it known that I, JOHN WATT MILLER, of Penfield, in the county of Clearfield and State of Pennsylvania, have invented certain new and useful Improvements in Saw-Handles; and I do hereby declare the following to be a full, clear, and exact description of the invention, such as will enable others skilled in the art to which it appertains to make and use the same.

My invention relates to an improvement in saw handles, the object being to provide a simple article of two parts capable of quick adjustment and which can be produced at a comparatively small price.

With these objects in view the invention consists in a loop or shank slotted to receive a saw blade and provided at one end with external screw threads, in connection with a handle having a ferrule secured thereon, one end adapted to receive the end of the handle and the other one internally screw threaded to receive and screw over the threaded end of the loop or shank.

My invention further consists in certain novel features of construction and combinations of parts as will be hereinafter described and pointed out in the claims.

In the accompanying drawings, Figure 1 is a view of the saw handle with all the parts assembled, parts being in section. Fig. 2 is a similar view of a modification, and Figs. 3 and 4 are modifications.

A represents the portion of the handle usually turned from wood, it being the handle proper. This part A is restricted preferably at one end $a$ as shown.

B is a ferrule having sockets $b$ and $c$ formed therein, one at each end, they being conveniently separated by a partition or web $d$. The restricted end $a$ of the handle proper A is enough smaller than the adjacent portion of the handle so that the ferrule when placed thereon with end $a$ in socket $b$, is about flush with the contiguous part of the handle, thus making a neat and smooth joint at this point. The partition or web $d$ is located inward a distance about equal to the length of the restricted end $a$ of the handle proper. This is an approved construction, though by no means necessary and this web or partition is provided centrally with a hole $e$ corresponding in position and in alignment with one formed through the longitudinal center of the handle proper. A bolt or rod C passes through this hole in the handle and the other in the web or partition and on its outer end it is preferably furnished with a head $f$ while at its inner end it may be screw-threaded whereby it may screw into the hole in the partition or web or have a nut $g$ turned upon it whereby to hold the ferrule securely in place on the handle A. In lieu of this both ends of the rod or bolt might be upset or the head might be inside and the nut outside, though the former construction is the one preferred.

D indicates the loop or shank. This is provided with the usual slot through which the end of the saw blade passes. Its upper end $h$ is screw threaded and adapted to screw into socket $c$ whereby the parts are held together. The length of socket $c$ is such that the ferrule may screw down to the upper edge of the saw blade whereby to lock the latter tightly in the slot of the shank. To further facilitate this a washer $i$ may be mounted on the shank and interposed between the ferrule and saw blade.

As a convenient means for sustaining the weight of the washer and for preventing its falling therefrom tangs $m$, $m$ are employed. These tangs are secured at the lower end of the ferrule and are bent outwardly at their lower ends against the washer as shown.

In the modification shown in Fig. 2 the ferrule is recessed as at $n$ just below the web or partition. By this means metal is saved and the weight of the device is lessened.

In the construction shown in Fig. 3 the web is omitted.

In the form shown in Fig. 4 the threaded portion is made thicker than the remaining portion of the ferrule.

It is evident that slight changes might be resorted to in the form and arrangement of the several parts described without departing from the spirit and scope of my invention and hence I do not wish to limit myself to the exact construction herein set forth; but, Having fully described my invention, what I claim as new, and desire to secure by Letters Patent, is—

1. The combination with ferrule having a web therein with a hole formed in it, said ferrule screw threaded internally, of a loop adapted to receive the saw blade and one end of the loop threaded to screw into the ferrule, a handle, and a bolt passed through the handle and the hole in the web for holding the ferrule on the handle, substantially as set forth.

2. The combination with a ferrule having a transverse web therein located a sufficient distance from each end to leave a receptacle at each end thereof, one end of the ferrule internally screw threaded, and a shank or loop threaded at one end to enter the threaded end of the shank of a handle fitted into the opposite end of the ferrule, and a rod passed through the handle and the web for holding the handle and ferrule together, substantially as set forth.

In testimony whereof I have signed this specification in the presence of two subscribing witnesses.

JOHN WATT MILLER.

Witnesses:
G. WOOD MILLER,
R. SMITH.